Figure 4:
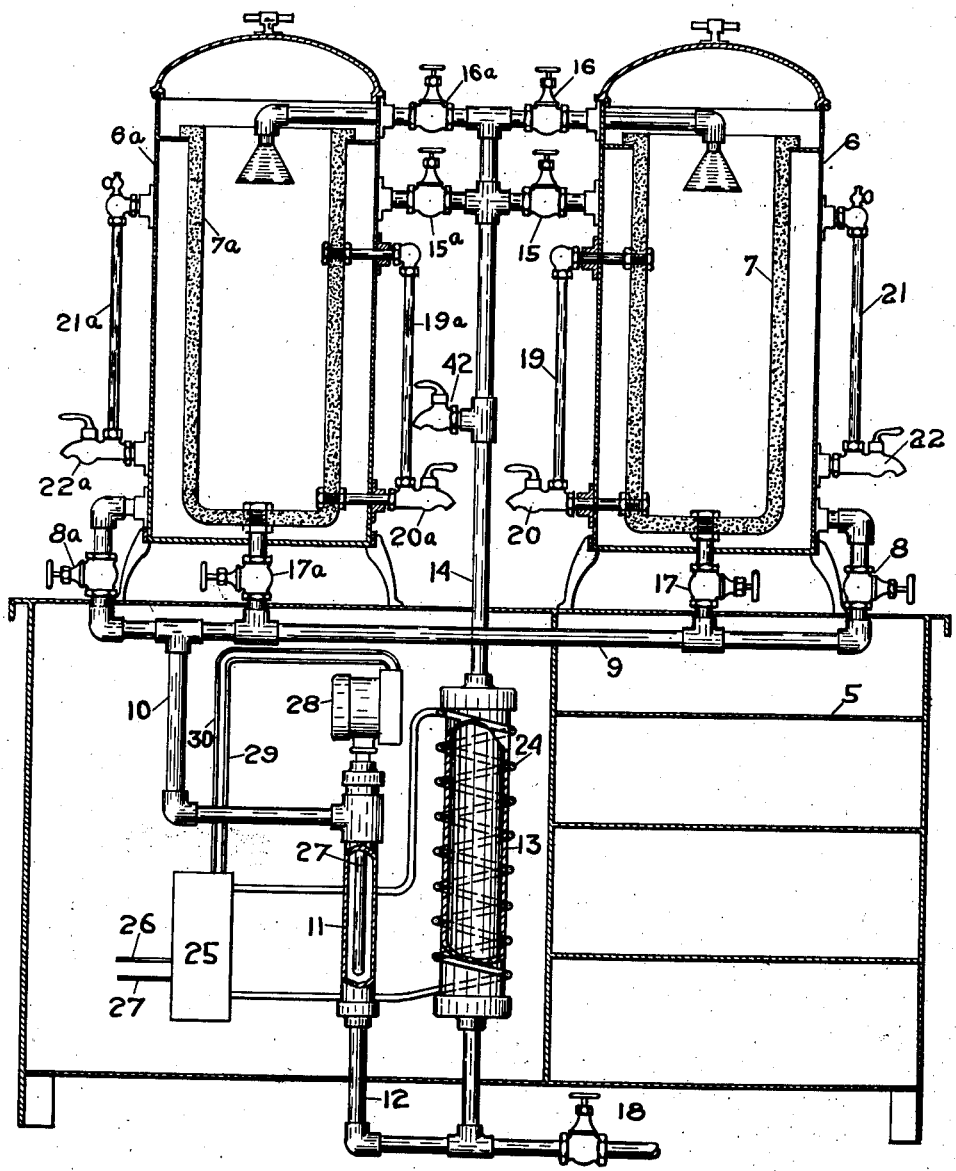

W. F. CLARK.
MULTIPLE URN CONSTRUCTION.
APPLICATION FILED DEC. 24, 1919.
1,397,620.
Patented Nov. 22, 1921.
2 SHEETS—SHEET 1.
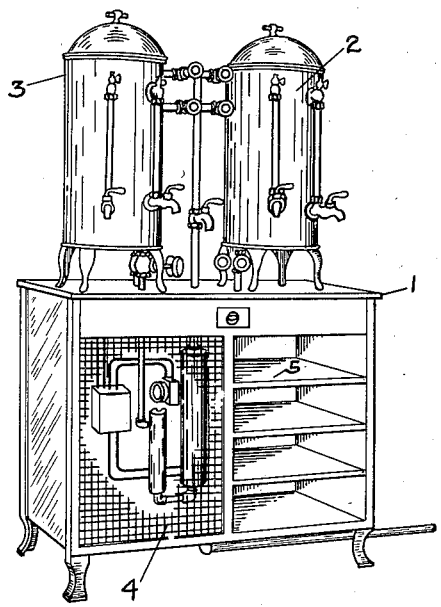
Fig. 1
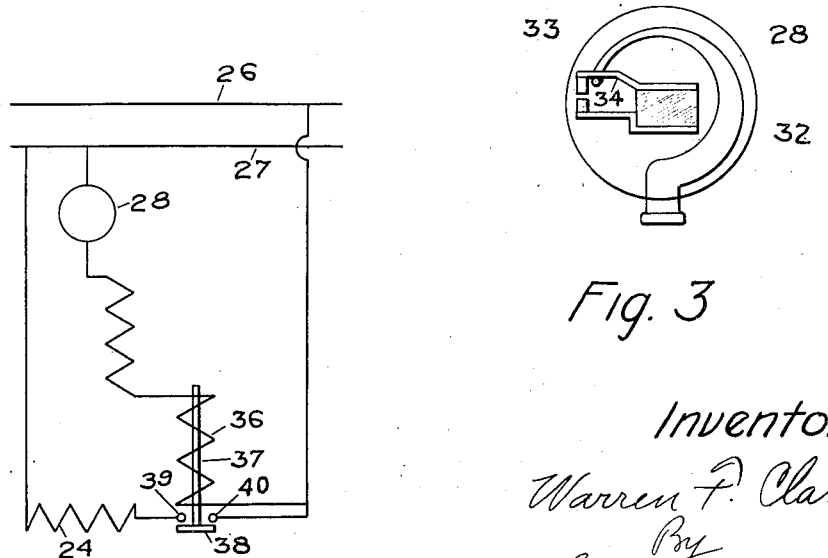
Fig. 2
Fig. 3
Inventor
Warren F. Clark.
By
Thurston, Kwis & Hudson
Attorneys

W. F. CLARK.
MULTIPLE URN CONSTRUCTION.
APPLICATION FILED DEC. 24, 1919.

1,397,620.

Patented Nov. 22, 1921.
2 SHEETS—SHEET 2.

Inventor
Warren F. Clark
By
Thurston Kwis & Hudson
Attorneys

UNITED STATES PATENT OFFICE.

WARREN F. CLARK, OF CLEVELAND, OHIO, ASSIGNOR, BY MESNE ASSIGNMENTS, TO AUTOMATIC ELECTRIC HEATER COMPANY, OF WARREN, PENNSYLVANIA, A CORPORATION OF DELAWARE.

MULTIPLE-URN CONSTRUCTION.

1,397,620. Specification of Letters Patent. Patented Nov. 22, 1921.

Application filed December 24, 1919. Serial No. 347,238.

*To all whom it may concern:*

Be it known that I, WARREN F. CLARK, a citizen of the United States, residing at Cleveland, in the county of Cuyahoga and State of Ohio, have invented a certain new and useful Improvement in Multiple-Urn Construction, of which the following is a full, clear, and exact description.

The present invention relates to a construction particularly adapted for urns used in making hot beverages and maintaining them in heated condition.

One of the objects of the invention is to provide a multiple arrangement of urns in which urns are connected, with a single source for heating, so that the water or other fluid which is ordinarily used to maintain the beverage in heated condition in the several urns, may all be heated in one heating apparatus.

A further object of the invention is to provide an arrangement so that the heating device which is associated with the urns may be so positioned with respect to a cabinet upon which it may be mounted that the heating device may also serve to heat the interior of the cabinet where food may be stored and kept in warm condition.

Other objects of the invention will appear as the description proceeds.

Reference should be had to the accompanying drawings forming a part of this specification in which Figure 1 is a perspective showing a plurality of urns mounted upon a cabinet; Fig. 2 is an electrical diagram; Fig. 3 is a diagrammatic illustration representing contacts operated by a Bourdon tube; Fig. 4 is an elevation with portions in section of an apparatus embodying the invention.

Referring to the drawings, 1 indicates a suitable cabinet or receptacle upon which a plurality of urns 2 and 3 are mounted. These urns are constructed so that hot water may circulate within the urns and the hot water is maintained in its heated condition by a heating apparatus which is generally designated at 4. This heating apparatus is located beneath the urns and within the cabinet 1 so that the heat which radiates from the heating apparatus, as of course some heat will radiate, may be utilized to maintain the interior of the cabinet in heated condition so that food which it is desired to keep warm may be stored in the cabinet, for instance on the shelves 5 or otherwise, and be readily accessible to be served. The present apparatus is particularly adapted for use in connection with the preparation and serving of beverages and usually the serving of food is an adjunct of the serving of hot beverages, hence the cabinet, the interior of which is maintained in warm condition, is a useful adjunct to the urns which are used to make hot beverages and maintain the beverages in heated condition after it is made.

In institutions where large amounts of hot beverages such as coffee are required, it is necessary to employ a battery of urns so that as the beverage is being dispensed from one of the urns, it may be prepared in another of the urns thereby maintaining a constant supply of the beverage.

It is usual in the preparation of hot beverages such as coffee, to deposit ground coffee in a suitable container within the urns and then to pour hot water over the ground coffee until the desired amount of hot water has been added and to draw off the water which has been poured over the coffee and again pour it into the urn, the operation being repeated until the desired strength of coffee is produced.

Urns as at present constructed usually have an interior receptacle which contains the beverage. This interior receptacle being surrounded by a chamber in which there is hot water, the water being maintained in its heated condition by means of a heating apparatus, such as a gas burner which is placed directly beneath the urn.

In the apparatus forming the subject matter of this invention the heating of the water which circulates around the beverage containing receptacle within the urn, is accomplished in a separate chamber, and the water is caused to circulate so that by suitable automatic regulating devices the temperature of the water can be quite accurately maintained.

A further accomplishment in the present apparatus is that after the ground coffee has been introduced into the urn in the making of a new quantity of beverage, the hot water which has already been circulating within the urn may be utilized to make the coffee and this hot water may be circulated in contact with the ground coffee and through the heating device for the purpose of obtaining the proper strength of the coffee or the beverage.

Moreover the arrangement is such that the single heating chamber may be connected to function in connection with any one or more of the urns which form the battery of urns employed.

Referring more particularly to Fig. 4, 6 indicates a container which is adapted more particularly to contain hot water. Within the container 6 there is a beverage container 7, this beverage container being supported in any suitable fashion within the hot water container 6.

The hot water container $6^a$ and the beverage container $7^a$ are in all respects similar to those which have been described.

The hot water container 6 is by means of a valve pipe 8 connected with a header 9 and the hot water container $6^a$ is by means of a valve pipe $8^a$ connected with the header 9. This header 9 has a pipe 10 connected therewith, which in turn connects with a casing 11 and the casing at the lower end thereof has a pipe 12 which connects with one end of a container, which I term a heated container 13.

At the opposite end of the heated container 13 a pipe 14 connects which extends upwardly and has valved branch pipes 15 and $15^a$ which in turn connect with the interior of the receptacles 6 and $6^a$ respectively, at points adjacent the upward ends of these receptacles. The pipe 14 also has valved extensions 16 and $16^a$ which extensions extend within the container 6 and $6^a$ and discharge into the upper portions of the beverage containers 7 and $7^a$ respectively.

At their lower ends the beverage containers 7 and $7^a$ are provided with valved conduits 17 and $17^a$ which connect with the header 9.

The lower end of the heated container 13 has a connection with a valved pipe 18 which is connected with an outside source of supply of water.

The beverage containers 7 and $7^a$ are each equipped with a sight glass 19 and $19^a$ respectively to indicate the level of beverage within the containers, and associated with each of the sight glasses is a suitable faucet such as indicated at 20 and $20^a$, by which the beverage may be withdrawn.

The containers 6 and $6^a$ are also equipped with sight glasses 21 and $21^a$ respectively, by which the level of water within the receptacles is indicated, and associated with each of these sight glasses are faucets 22 and $22^a$ respectively, by which hot water may be withdrawn from the receptacles when desired.

The heated receptacle 13, may have heat applied thereto in any desired manner, but in the present instance and as the preferable way of accomplishing the desired result, I provide an electric heating element which is associated with the heated receptacle 13. This heating element comprises a coil of wire 24 which is wound around the chamber 13 substantially from end to end thereof. This coil is made of suitable resistance wire and when current is caused to pass through the wire, the heat thereof penetrates through the walls of the chamber and is absorbed by the contents of the receptacle. This heating coil 13 is connected with a suitable relay such as indicated at 25, which relay is in turn connected with the conductors 26 and 27, which may be connected with any suitable source of electric current.

In connection with the electrical heating equipment thus described I employ a device for controlling the functioning of the heating coil, which control is in accordance with the predetermined condition which it is desired to maintain.

In carrying this into effect, I provide a tube 27, which tube contains a suitable easily volatilized substance such as ether, and the tube at its upper end connects with the Bourdon tube which is within a casing 28.

The casing contains contact members which are operated by the Bourdon tube, which contact members are connected with the conductors 29 and 30 which extend to the relay and in turn control the functioning of the relay.

In Fig. 3 I have rather conventionally indicated a Bourdon tube 32, which is connected with the tube 27. This Bourdon tube at the end thereof is provided with a pin 33 which extends beneath a flexible contact member 34. The contact member 34 is positioned with respect to a contact member 35, such that the contact members are normally in engagement but are moved to disengaged position when the Bourdon tube has expanded sufficiently for the purpose.

Referring to Fig. 2, the electrical connections by which the functioning of the heating coil is controlled are illustrated. The relay which has been heretofore referred to comprises a hollow coil 36 through which extends a rod 37 of magnetically permanent material. This rod carries a contact closure 38 and is in position to engage with contacts 39 and 40, which contacts control the passage of current through the heating coil 24. The passage of current through the coil 36 is, however, controlled by the contacts 34 and 35 within the casing 28. When these contacts are closed, current passing through the coil 36 draws the rod 37 so that the contacts 39 and 40 are closed, hence, current is supplied to the heating coil 24. This relationship continues until the expansion of the Bourdon tube is sufficient to cause the contacts 34 and 35 to part at which time current ceases to pass through the coil 36 and the contact making member 38 is released, thereby opening the circuit through the heating coil 24.

As will be noted by reference to Fig. 4, the tube 27 is in contact with liquid passing through the member 11 on its way to the heat container 13, hence the pressure condition within the tube 27 is directly conditional upon the heat of the liquid which is passing around this tube.

In describing the operation of the device, we will assume that a prepared beverage is within the beverage container 7. Under these circumstances the container 6 which surrounds the beverage container 7 is filled to a suitable degree with water. The valves 8 and 15 are opened and all the other valves in the system are closed, thus water from the container 6 will circulate through the header 9, through the pipe 10, casing 11, heated container 13, pipe 14 and valve connection 15.

The heating of the water as it passes through the heated container 13 causes this circulation of hot water and the heating effect is continued until the controlling device which comprises the tube 27 and the parts connected therewith, becomes responsive to the temperature condition of the liquid passing through the casing 11 at which time the current to the coil is discontinued.

In this fashion the hot water which is caused to circulate around the beverage container 7 may be maintained at substantially any temperature which is desired.

It will be apparent that the same effect is secured within the container 6ᵃ if the valves 8ᵃ and 15ᵃ are opened and the remaining valves of the system closed, and on the other hand, if all the valves 8 and 8ᵃ, 15 and 15ᵃ are opened and the remaining valves of the system closed, the circulation of water through the containers 6 and 6ᵃ will be simultaneous.

When it is desired to prepare a beverage within a beverage container and for the purpose we may assume the preparation of coffee within the beverage container 7, the ground coffee is introduced into the container 7, contained within a suitable bag or other container, and the valve 16 is opened while the valve 15 is closed, the valve 8 is allowed to remain open while the other valves in the system are closed, with the exception of the valve 18, which is connected with the outside source of water. Under these conditions the hot water passes through the valve connection 16 and flows into the beverage container 7 until a sufficient amount of water is contained within the beverage container, whereupon the valve 18 is closed and the valve 8 is closed and the valve 17 is opened. This causes a circulation of liquid through the container 7, and this liquid is heated as it passes through the heated chamber 13, therefore the liquid is circulated through the beverage container 7 and in contact with the ground coffee until the desired strength of beverage solution is obtained.

Obviously, a beverage may be prepared in the container 7ᵃ simultaneously with the preparation of the beverage within the beverage container 7 by manipulation of the necessary valves.

Furthermore, the hot water which has heretofore been contained in one of the containers 6 or 6ᵃ, may be utilized in the preparation of the beverage in the other of the beverage containers.

After the preparation of a beverage in one or both of the beverage containers, it is desirable to remove the beverage from the system so that subsequently when the water is circulated through the system and through the containers 6 and 6ᵃ, it will not be contaminated with the beverage, therefore the faucet 42 is provided, which when opened will permit the contents of the system to pass out of that faucet and it may be maintained at open position until the beverage is taken from the system and supplanted by water.

While in the foregoing description I have described the action of the heating chamber 13 with respect to two urns, it will be apparent that the same principles of construction may be applied where more than two urns are employed.

Having described my invention, I claim:

1. The combination with a plurality of liquid containing receptacles, a beverage receptacle located in each of the liquid containing receptacles, means for dispensing the beverage from said beverage receptacles, a heating receptacle, conduits connecting two points of each receptacle with two points of the heating receptacles, valves controlling said conduits whereby either or both of the liquid containing receptacles may be connected with the heating receptacle and means for heating said heating receptacle.

2. The combination with a plurality of liquid containing receptacles, a beverage receptacle located in each of the liquid containing receptacles, means for dispensing the beverage from said beverage receptacles, a heating receptacle, means for heating said heating receptacle, means for controlling the functioning of said heating means in accordance with the temperature condition of the liquid flowing through the heating receptacle, conduits connecting two points of each receptacle with two points of the heating receptacle, valves controlling said conduits whereby either or both of the liquid containing receptacles may be connected with the heating receptacle.

3. The combination with a plurality of liquid containing receptacles, a beverage receptacle located in each of the liquid containing receptacles, means for dispensing the beverage from said beverage receptacles, a heating receptacle, a header, a pipe connecting said header with the heating receptacle, pipes connecting said header with each of the liquid containing receptacles, a second pipe connected with the heating receptacle and connections from said pipe to each of said liquid containing receptacles, and valves associated with each of the said pipes whereby either or both of the liquid containing receptacles may be connected with the heating receptacle.

4. The combination with a plurality of liquid containing receptacles, a heating receptacle, an electric coil surrounding said heating receptacle, means controlling the functioning of said coil, said means being controlled by the temperature of liquid passing through the heating receptacle, conduits connecting two points of each receptacle with two points of the heating receptacle, valves controlling said conduits whereby either or both of the liquid containing receptacles may be connected with the heating receptacle.

5. The combination with a plurality of liquid containing receptacles, a beverage containing receptacle within each liquid containing receptacle, a heating receptacle, conduits connecting two points of each beverage receptacle and each liquid containing receptacle with two points of the heating receptacle, valves controlling the said conduits whereby one or more of said receptacles may be connected with the heating receptacle.

6. The combination with a plurality of liquid containing receptacles, a beverage containing receptacle within each liquid containing receptacle, a heating receptacle, a header and pipe connecting said header with the heating receptacle, a pipe connecting said header with each liquid containing receptacle, pipes connecting each beverage containing receptacle with the header, a conduit connected with the heating receptacle, pipes leading from said conduit connecting each of the liquid containing receptacles therewith and pipes connected with said conduit and communicating with each beverage receptacle, valves controlling the said pipes whereby one or more of the aforesaid receptacles may be connected with the heating receptacle.

In testimony whereof, I hereunto affix my signature.

WARREN F. CLARK.